United States Patent
Niebauer et al.

(10) Patent No.: US 6,231,992 B1
(45) Date of Patent: May 15, 2001

(54) PARTIAL REFLECTOR

(75) Inventors: Daniel A. Niebauer; Barry F. T. Bolker, both of Camarillo, CA (US)

(73) Assignee: Yazaki Corporation (JP)

( * ) Notice: Subject to any disclaimer, the term of this patent is extended or adjusted under 35 U.S.C. 154(b) by 0 days.

(21) Appl. No.: 09/148,839

(22) Filed: Sep. 4, 1998

(51) Int. Cl.$^7$ .................................................. B32B 15/04
(52) U.S. Cl. ........................ 428/472; 428/469; 428/433; 428/220; 359/583; 359/360; 359/584; 359/586; 359/589
(58) Field of Search ..................... 428/433, 469, 428/472, 432, 220; 359/583, 360, 584, 586, 589

(56) References Cited

U.S. PATENT DOCUMENTS

| | | |
|---|---|---|
| 3,673,981 | 7/1972 | Beckham et al. . |
| 3,826,728 | 7/1974 | Chambers et al. . |
| 4,022,947 | 5/1977 | Grubb et al. . |
| 4,337,990 | 7/1982 | Fan et al. . |
| 4,415,233 | 11/1983 | Itoh et al. .............................. 350/173 |
| 4,556,277 | 12/1985 | Fan et al. . |
| 4,676,992 | 6/1987 | Letellier . |
| 4,721,349 | 1/1988 | Fan et al. . |
| 4,773,717 | 9/1988 | Pai et al. . |
| 4,822,748 | 4/1989 | Janesick et al. . |
| 4,904,083 | 2/1990 | Lu et al. . |
| 4,931,315 | 6/1990 | Mellor . |
| 4,932,754 | 6/1990 | Haisma et al. . |
| 4,979,802 | 12/1990 | Ichikawa . |
| 5,007,689 | 4/1991 | Kelly et al. . |
| 5,055,358 | 10/1991 | Livingston . |
| 5,140,457 | 8/1992 | Letter . |
| 5,171,414 | 12/1992 | Amberger et al. . |
| 5,194,989 | 3/1993 | Ferrante et al. . |
| 5,198,930 | 3/1993 | Muratomi . |
| 5,216,551 | 6/1993 | Fujii ..................................... 359/884 |
| 5,289,315 | 2/1994 | Makita et al. . |
| 5,306,547 * | 4/1994 | Hood et al. . |
| 5,372,874 | 12/1994 | Dickey et al. . |
| 5,413,864 | 5/1995 | Miyazaki et al. . |
| 5,419,969 | 5/1995 | Miyazaki et al. . |
| 5,505,989 | 4/1996 | Jenkinson . |
| 5,510,173 | 4/1996 | Pass et al. . |
| 5,521,759 | 5/1996 | Dobrowolski et al. . |
| 5,532,062 | 7/1996 | Miyazaki et al. . |
| 5,652,046 * | 7/1997 | Beaufays et al. . |
| 5,808,714 * | 9/1998 | Rowlands et al. . |
| 5,837,361 * | 11/1998 | Glaser et al. . |

FOREIGN PATENT DOCUMENTS

| | | |
|---|---|---|
| 2 684 769 | 6/1993 | (FR) . |
| WO 92/04185 | 3/1992 | (WO) . |

* cited by examiner

*Primary Examiner*—Deborah Jones
*Assistant Examiner*—Wendy Boss
(74) *Attorney, Agent, or Firm*—Sheppard, Mullin, Richter & Hampton LLP; James R. Brueggemann

(57) ABSTRACT

An improved partial reflector is disclosed in which the reflector is configured to provide selected levels of reflectance, transmittance and efficiency that are substantially uniform over the visible wavelength range of 400 to 700 nanometers. This result is achieved using a special three-layer coating that includes a metal layer sandwiched between two metal oxide dielectric layers having relatively high refractive indices >2.0. Advantageously, the three layers all incorporate the same metal, preferably niobium.

17 Claims, 3 Drawing Sheets

PARTIAL REFLECTOR

BACKGROUND OF THE INVENTION

This invention relates generally to partial reflectors and, more particularly, to partial reflectors that include multi-layer, thin-film coatings deposited on substrates.

Partial reflectors, which sometimes are referred to as half mirrors or beamsplitters, are used in numerous applications. Such reflectors function both to reflect and to transmit light, in prescribed relative proportions. It usually is desirable to control not only the relative proportions of reflected and transmitted light, but also the reflector's efficiency, which represents the sum of its reflectance and transmittance. Whatever light is not reflected or transmitted is absorbed, which generally will heat the reflector.

In many optical applications, e.g., laser machining, excessive heating of the partial reflector can be particularly disadvantageous. Consequently, efficiencies near 100% are desired for such applications. In other optical applications, however, e.g., imaging and information display applications, achieving a high efficiency generally is considered to be less important than is achieving a desired ratio of reflectance and transmittance.

Reflectors and partial reflectors used in the past frequently have incorporated simple thin-film metallic coatings of silver or aluminum deposited on transparent glass or plastic substrates. Common household mirrors, for example, incorporate such coatings on the rear surfaces of such substrates, to protect the coatings from undesired environmental factors such as mechanical abrasion, oxidation and corrosion. In some applications, however, the metallic coating must be deposited on an exposed, front surface of the substrate. In those applications, rhodium, chromium and nickel-chromium alloys can be substituted for silver or aluminum, to provide better resistance to such environmental factors. Such thin metallic films sometimes can be protected by thin-film overcoats of silicon oxide or silicon dioxide, but these overcoats can affect the reflector's reflectance.

Partial reflectors based on simple thin-film metallic coatings cannot be readily configured to allow for independent selection of the reflectance, transmittance and efficiency. Basically, insufficient degrees of freedom are available to optical designers of such partial reflectors.

As an example, FIG. 1 shows the relationship between reflectance and transmittance for a number of partial reflectors having the form of thin-film coatings of aluminum deposited on transparent glass substrates, wherein the coatings for the reflectors range in thickness from 1.0 nanometer to 20 nanometers. It will be noted that increases the coating's thickness increases the partial reflector's reflectance and decreases its transmittance. It also will be noted that the partial reflectors generally exhibit higher reflectance in red wavelengths than in blue wavelengths and that the reflectors generally have efficiencies in the range of 80 to 90%.

Further, FIG. 2 shows this same fixed relationship between reflectance and transmittance for partial reflectors in the form of thin-film coatings of chromium deposited on transparent glass substrates. It will be noted that the spectral responses of the chromium reflectors are substantially more uniform, but that they have efficiencies of only about 60% in the middle of the depicted range. Changing the substrates from glass to polymethyl methacrylate has little effect on the depicted relationships.

Partial reflectors also can be formed by depositing thin-film dielectric coatings onto transparent substrates. For example, a partial reflector incorporating a single film of dielectric material (e.g., titanium dioxide, with a refractive index at 550 nanometers of about 2.34, deposited on a glass substrate) can exhibit about 33% reflectance and 65% transmittance, thus providing an efficiency of about 98%. Partial reflectors incorporating multiple layers of alternating high-index and low-index dielectric materials can exhibit higher reflectance, with greater spectral uniformity. Again, efficiencies approaching 100% can be achieved.

FIG. 3 depicts the reflectance and transmittance levels of a partial reflector incorporating a nine-layer dielectric coating. The coating incorporates an alternating stack of titanium dioxide and silicon dioxide deposited on a glass substrate. It will be noted that the depicted reflectance and transmittance levels exhibit pronounced maxima and minima as a function of wavelength, with an overall efficiency of about 73%. Multi-layer dielectric coatings of yet greater complexity are considered necessary to produce more uniform reflectance and transmittance spectra. This, of course, can lead to higher costs and manufacturing difficulties.

Other partial reflectors used in the past have included a three-layer stack deposited on a transparent substrate, in which the stack incorporates an intermediate metal layer (e.g., titanium) sandwiched between an inner layer formed of a material having a relatively high refractive index (e.g., titanium dioxide) and an outer layer formed of a material having a relatively low refractive index (e.g., silicon dioxide). Although the configuration of this partial reflector generally provides for greater independent selectability of reflectance, transmittance and efficiency than do the configurations of the partial reflectors described briefly above, it is considered unduly difficult and costly to manufacture.

It should, therefore, be appreciated that there is a need for an improved partial reflector configured to provide selected, spectrally uniform levels of reflectance, transmittance and efficiency, without being unduly difficult and costly to manufacture. The present invention fulfills this need and provides further related advantages.

SUMMARY OF THE INVENTION

The present invention is embodied in an improved partial reflector (i.e., half mirror or beamsplitter) configured to provide selected, spectrally uniform levels of reflectance, transmittance and efficiency, without being unduly difficult and costly to manufacture. The partial reflector of the invention incorporates a multi-layer, thin-film coating deposited on a surface of a substrate, the coating including a first, metal oxide layer, a second, metal layer overlaying the first layer, and a third, metal oxide layer overlaying the second layer. All three layers have prescribed, uniform thicknesses. In accordance with one feature of the invention, the metal incorporated in the coating's three layers is the same, and the thicknesses of the layers are selected or tailored to provide the partial reflector with prescribed reflectance and transmittance values that are substantially uniform over a wavelength band of about 400 to 700 nanometers.

More particularly, the metal incorporated into the three layers of the partial reflector's thin-film coating is just a single element selected from the group consisting of niobium, tantalum, titanium, hafnium and zirconium. Preferably, the metal is niobium, in which case the prescribed thickness ranges for the three layers are about 2 to 55 nanometers for the first layer, 3.5 to 36 nanometers for the second layer, and 2 to 60 nanometers for the third layer.

In a separate and independent feature of the invention, the refractive indices of the metal oxides that comprise the first and third layers, which sandwich the second, metal layer, both are relatively high, i.e., greater than 2.0. A partial reflector incorporating this feature has utility whether or not the three layers all incorporate the same metal.

Other features and advantages of the present invention should become apparent from the following description of the preferred embodiments, taken in conjunction with the accompanying drawings, which illustrate, by way of example, the principles of the invention.

DESCRIPTION OF THE PREFERRED EMBODIMENTS

Figure 1:
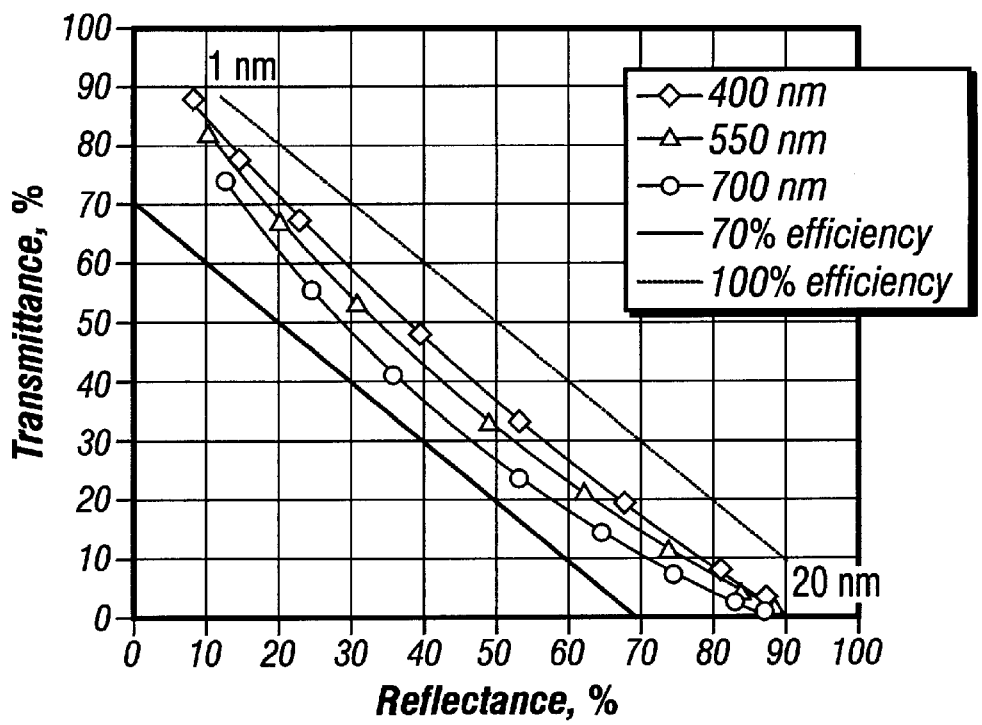
FIG. 1 is a graph depicting the relationship between reflectance and transmittance for prior art partial reflectors incorporating thin-film coatings of aluminum deposited on glass substrates.
Figure 2:
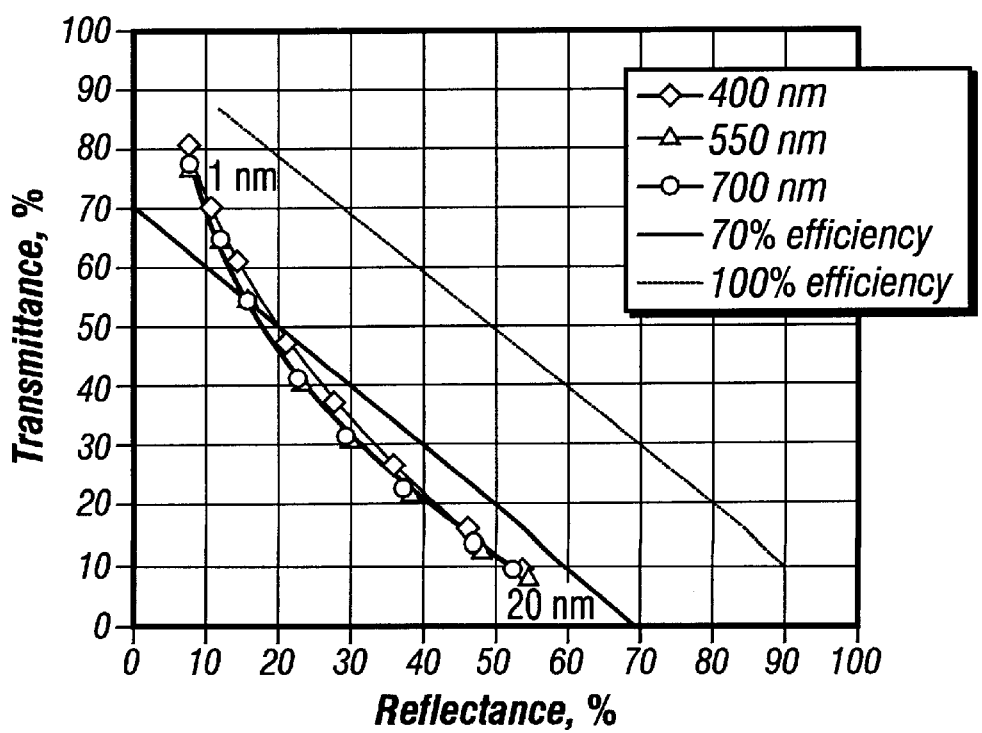
FIG. 2 is a graph depicting the relationship between reflectance and transmittance for prior art partial reflectors incorporating thin-film coatings of chromium deposited on glass substrates.
Figure 3:
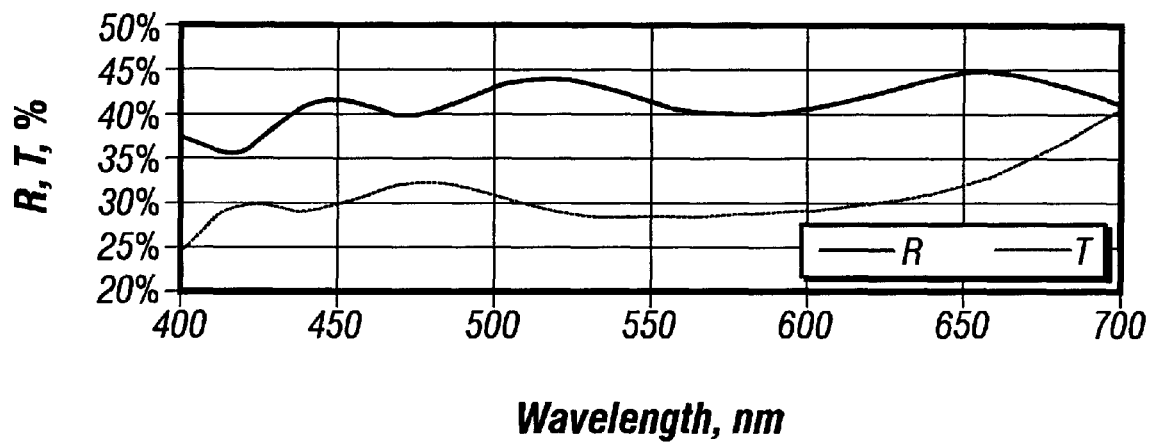
FIG. 3 is a graph depicting the reflectance and transmittance levels of a prior art partial reflector incorporating a nine-layer dielectric coating deposited on a glass substrate, as such levels vary with wavelength.
Figure 4:
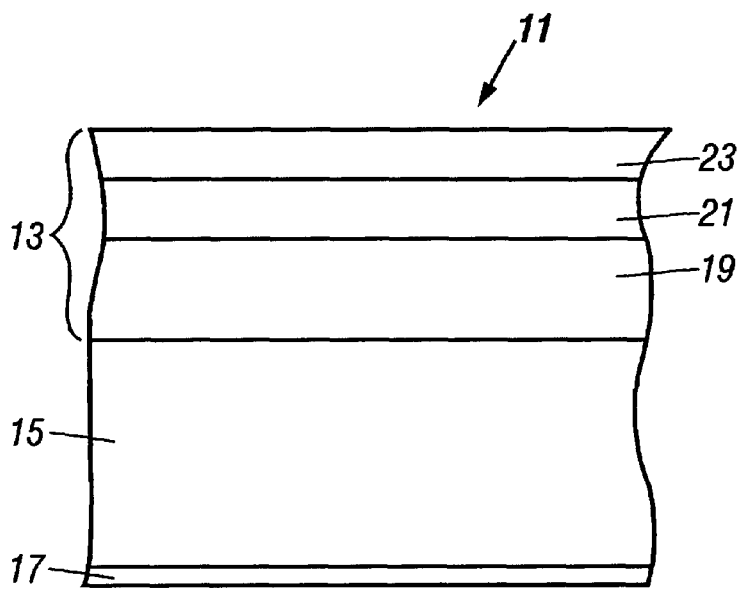
FIG. 4 is a cross-sectional view, not to scale, of a partial reflector embodying the invention, the reflector incorporating a three-layer, thin-film coating deposited on a transparent substrate.
Figure 5:
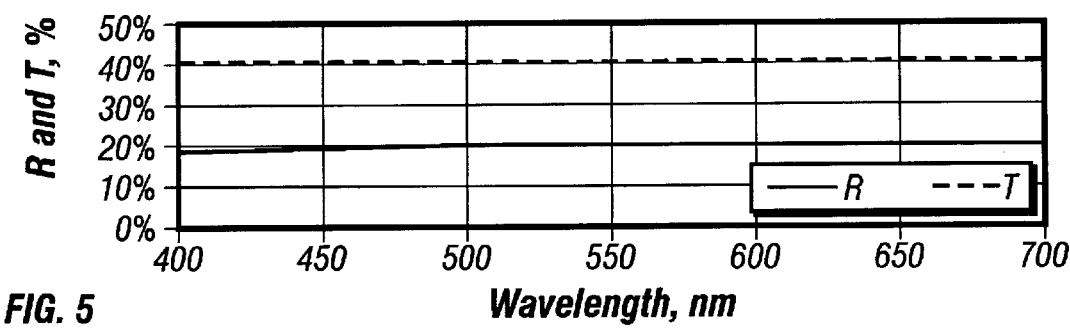
FIG. 5 is a graph depicting the reflectance and transmittance levels of the partial reflector of Example 1, as such levels vary with wavelength.
Figure 6:
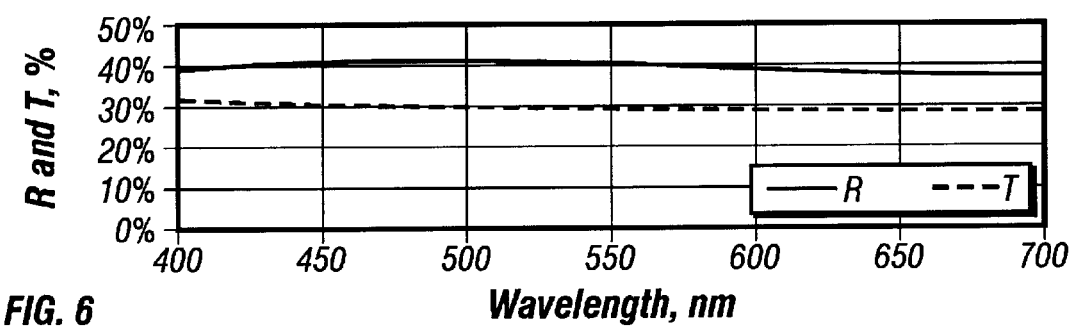
FIG. 6 is a graph depicting the reflectance and transmittance levels of the partial reflector of Example 2, as such levels vary with wavelength.
Figure 7:
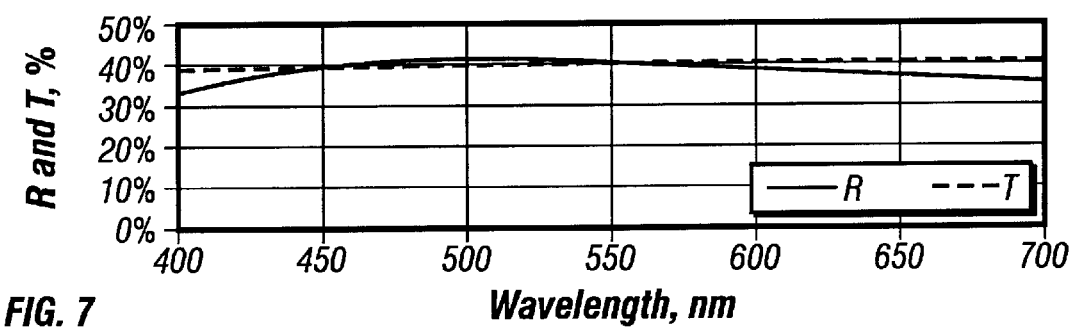
FIG. 7 is a graph depicting the reflectance and transmittance levels of the partial reflector of Example 3, as such levels vary with wavelength.
Figure 8:
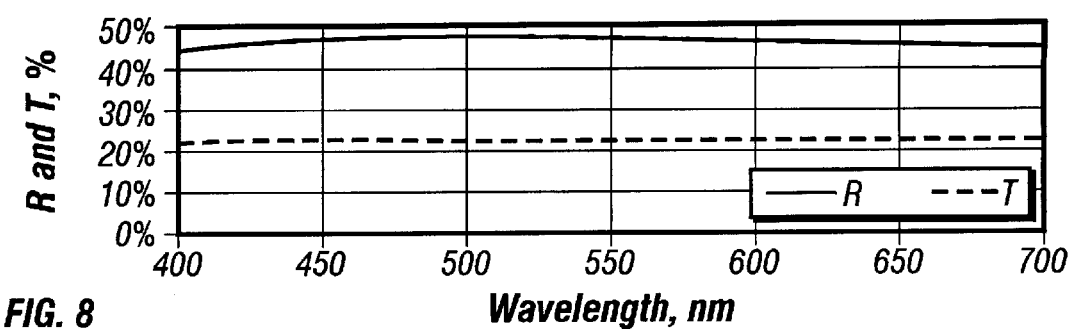
FIG. 8 is a graph depicting the reflectance and transmittance levels of the partial reflector of Example 4, as such levels vary with wavelength.

With reference now to the drawings, and particularly to FIG. 4, there is shown a partial reflector 11 that incorporates a three-layer, thin-film coating 13 deposited on a front surface of a transparent substrate 15. The three layers of the coating all incorporate a common metal, and they are configured to facilitate a convenient selection of the partial reflector's desired levels of reflectance, transmittance and efficiency. In addition, this convenient selectability is achieved without the need for a complex or costly manufacturing procedure. The back surface of the substrate can carry an optional antireflection or antiglare coating 17, of conventional design.

More particularly, the three-layer, thin-film coating 13 incorporates a first, inner layer 19, a second, intermediate layer 21, and a third, outer layer 23. The first layer 19 is formed of a metal oxide having a relatively high refractive index, i.e., >2.0. The metal incorporated into the first layer can be selected from the group consisting of niobium (Nb), tantalum (Ta), titanium (Ti), hafnium (Hf), and zirconium (Zr). The second layer 21 is formed only of the same metal as is incorporated into the first layer. The third layer 23 is formed of the same metal oxide as is the first layer, again having a relatively high refractive index, i.e., >2.0.

Functionally, the first layer 19 of the three-layer coating 13 provides a portion of the partial reflector's desired reflectance, but little or no absorbance. The second layer 21 provides a portion of the desired reflectance, but primarily controls the reflector's desired transmittance and efficiency. The third layer 23 provides additional tuning of the reflector's optical characteristics, but primarily functions as a protective overcoat. The partial reflector's reflectance derives from both constructive interference and metallic conductor reflectance, while its efficiency derives principally from the thickness of the second, metallic layer.

The transmittance and efficiency of the partial reflector 11 also can be affected by the transparency of the substrate 15. Partially absorbing substrates such as 18% grey polymethyl methacrylate (PMMA) and 30% grey PMMA are suitable for use in reducing the reflector's transmittance and efficiency.

The actual thicknesses needed for the three layers of the thin-film coating 13 to achieve particular desired levels of reflectance, transmittance and efficiency, can be derived using a suitable computer software program for optical thin-film design. Suitable programs can be obtained from FTG Software Associates, of Princeton, N.J., and from Thin Film Center, Inc., of Tucson, Ariz. Such programs can be used to specify the particular thicknesses necessary to achieve these levels, given the layers' specific refractive indices.

For embodiments of the invention in which the metal incorporated into the three layers 19, 21 and 23 of the coating 13 is niobium, the preferred thickness ranges are 2.0 to 55 nanometers for the first layer 19, 3.5 to 36 nanometers for the second layer 21, and 2.0 to 60 nanometers for the third layer 23. By carefully selecting thicknesses within these ranges, reflectances in the range of about 10 to 50%, transmittances in the range of about 5 to 60%, and efficiencies in the range of about 55 to 80%, can be achieved.

The following Table sets forth the layer thicknesses of four different partial reflectors 11 incorporating three-layer coatings 13 in accordance with the invention, wherein the coatings all incorporate the metal niobium. These four examples each provide selected levels of reflectance, transmittance and efficiency.

TABLE

| | Example 1 | Example 2 | Example 3 | Example 4 |
|---|---|---|---|---|
| First Layer 19 ($Nb_2O_5$ thickness, nm) | 6.3 | 35 | 51 | 39 |
| Second Layer 21 (Nb thickness, nm) | 8.3 | 14 | 8.7 | 18 |
| Third Layer 23 ($Nb_2O_5$ thickness, nm) | 14 | 11 | 8 | 8 |
| Average Reflectance | 20.0% | 39.7% | 39.2% | 46.3% |
| Average Transmittance | 40.6% | 29.8% | 39.9% | 23.1% |
| Average Efficiency | 60.6% | 69.5% | 79.1% | 69.3% |

FIGS. 5–8 depict the reflectance and transmittance levels of the partial reflectors of Examples 1–4, respectively, as a function of wavelength. It will be noted that these levels vary only slightly in the visible wavelength range of 400 to 700 nanometers. The average values for reflectance and transmittance in this wavelength range are set forth in the above Table.

The partial reflector of Example 1 is configured to provide a transmittance level about twice the reflectance level. In contrast, the reflector of Example 4 is configured to provide an optical performance that is reversed, i.e., a reflectance level about twice the transmittance level. The reflector of Example 2 is configured to provide a reflectance of about 40% and a transmittance of about 30%, and the reflector of Example 3 is configured to provide an efficiency of about 80%, with substantially equal levels of reflectance and transmittance.

It will be appreciated that the partial reflector 11 of the invention is configured to provide selected levels of reflectance, transmittance and efficiency that are substantially uniform over the entire visible wavelength range of 400 to 700 nanometers. This makes the reflector suitable for use in a wide range of applications, including imaging and information display applications, and laser data retrieved (e.g., CD ROM) applications.

One important advantage of the partial reflector 11 of the invention is that the three layers 19, 21 and 23 of its thin-film coating 13 all incorporate the same metal. This simplifies the manufacturing process and leads to significant cost savings. For example, if vapor deposition techniques are used, this enables the coating to be conveniently manufactured using just a single sputter target material or a single evaporation material. Similar manufacturing benefits will result if other thin film deposition techniques, e.g., chemical vapor deposition, are used.

It should be appreciated from the foregoing description that the present invention provides an improved partial reflector that can provide selected levels of reflectance, transmittance and efficiency that are substantially uniform over the visible wavelength range. This result is achieved using a special three-layer coating that includes a metal layer sandwiched between two metal oxide dielectric layers having relatively high refractive indices >2.0. Advantageously, the three layers all incorporate the same metal, preferably niobium.

Although the invention has been described in detail with reference only to the preferred embodiments, those of ordinary skill in the art will appreciate that various modifications can be made without departing from the invention. Accordingly, the invention is defined only by the following claims.

We claim:

1. A partial reflector comprising:
   a substrate having a front surface and a rear surface; and
   a multi-layer, thin-film coating deposited on one of the surfaces of the substrate, wherein the coating includes
      a first layer having a prescribed, uniform thickness, wherein the first layer is formed of a prescribed metal oxide,
      a second layer overlaying the first layer and having a prescribed, uniform thickness, wherein the second layer is formed of a prescribed metal, and
      a third layer overlaying the second layer and having a prescribed, uniform thickness, wherein the third layer is formed of a prescribed metal oxide,
      wherein the metal incorporated in the coating's first, second and third layers is the same and consists essentially of niobium, hafnium or zirconium,
      and wherein the prescribed thicknesses of the first, second and third layers are selected to provide the partial reflector with prescribed, non-zero reflectance and transmittance values that are substantially uniform over a wavelength band of about 400 to 700 nanometers.

2. A partial reflector as defined in claim 1, wherein the multi-layer, thin-film coating is configured such that the reflector has a transmittance of at least 20% and a reflectance of at least 20%, over a wavelength band of about 400 to 700 nanometers.

3. A partial reflector as defined in claim 1, wherein the metal is niobium.

4. A partial reflector as defined in claim 3, wherein:
   the prescribed thickness of the first layer is in the range of about 2 to 55 nanometers;
   the prescribed thickness of the second layer is in the range of about 3.5 to 36 nanometers; and
   the prescribed thickness of the third layer is in the range of about 2 to 60 nanometers.

5. A partial reflector as defined in claim 1, wherein the refractive indices of the first and third layers of the multi-layer coating both are greater than 2.0.

6. A partial reflector comprising:
   a substrate having a front surface and a rear surface; and
   a multi-layer, thin-film coating deposited on one of the surfaces of the substrate, wherein the coating includes
      a first layer having a prescribed, uniform thickness, wherein the first layer is formed of a prescribed metal oxide having a refractive index greater than 2.0,
      a second layer overlaying the first layer and having a prescribed, uniform thickness, wherein the second layer is formed of a prescribed metal, and
      a third layer overlaying the second layer and having a prescribed, uniform thickness, wherein the third layer is formed of a prescribed metal oxide having a refractive index greater than 2.0,
      wherein the metal incorporated in the coating's first, second and third layers is the same and is selected from the group consisting of niobium, hafnium and zirconium,
      and wherein the prescribed thicknesses of the first, second and third layers are selected to provide the partial reflector with prescribed non-zero reflectance and transmittance values that are substantially uniform over a wavelength band of about 400 to 700 nanometers.

7. A partial reflector as defined in claim 6, wherein the multi-layer, thin-film coating is configured such that the reflector has a transmittance of at least 20% and a reflectance of at least 20%, over a wavelength band of about 400 to 700 nanometers.

8. A partial reflector as defined in claim 6, wherein the metal is niobium.

9. A partial reflector as defined in claim 8, wherein:
   the prescribed thickness of the first layer is in the range of about 2 to 55 nanometers;
   the prescribed thickness of the second layer is in the range of about 3.5 to 36 nanometers; and
   the prescribed thickness of the third layer is in the range of about 2 to 60 nanometers.

10. A partial reflector comprising:
    a substrate having a front surface and a rear surface; and
    a multi-layer, thin-film coating deposited on one of the surfaces of the substrate, wherein the coating consists of
       a first layer having a prescribed, uniform thickness, wherein the first layer is formed of a prescribed metal oxide,
       a second layer overlaying the first layer and having a prescribed, uniform thickness, wherein the second layer is formed of a prescribed metal, and a third layer overlaying the second layer and having a prescribed, uniform thickness, wherein the third layer is formed of a prescribed metal oxide, wherein the metal incorporated in the coating's first, second and third layers is the same and consists essentially of niobium, titanium, hafnium or zirconium, and wherein the prescribed thicknesses of the first, second and third layers are selected to provide the partial reflector with prescribed, non-zero reflectance and transmittance values that are substantially uniform over a wavelength band of about 400 to 700 nanometers.

11. A partial reflector as defined in claim 10, wherein the multi-layer, thin-film coating is configured such that the reflector has a transmittance of at least 20% and a reflectance of at least 20%, over a wavelength band of about 400 to 700 nanometers.

12. A partial reflector comprising:

a substrate having a front surface and a rear surface;

an antireflection coating deposited on the rear surface of the substrate; and a multi-layer, thin-film coating deposited on the front surface of the substrate, wherein the multi-layer coating includes a first layer having a prescribed, uniform thickness, wherein the first layer is formed of a prescribed metal oxide, a second layer overlaying the first layer and having a prescribed, uniform thickness, wherein the second layer is formed of a prescribed metal, and a third layer overlaying the second layer and having a prescribed, uniform thickness, wherein the third layer is formed of a prescribed metal oxide, wherein the metal incorporated in the coating's first, second and third layers is the same and consists essentially of niobium, titanium, hafnium or zirconium, and wherein the prescribed thicknesses of the first, second and third layers are selected to provide the partial reflector with prescribed, non-zero reflectance and transmittance values that are substantially uniform over a wavelength band of about 400 to 700 nanometers.

13. A partial reflector as defined in claim 12, wherein the multi-layer, thin-film coating is configured such that the reflector has a transmittance of at least 20% and a reflectance of at least 20%, over a wavelength band of about 400 to 700 nanometers.

14. A partial reflector comprising:

a substrate having a front surface and a rear surface; and a multi-layer, thin-film coating deposited on one of the surfaces of the substrate, wherein the coating consists of a first layer having a prescribed, uniform thickness, wherein the first layer is formed of a prescribed metal oxide having a refractive index greater than 2.0, a second layer overlaying the first layer and having a prescribed, uniform thickness, wherein the second layer is formed of a prescribed metal, and a third layer overlaying the second layer and having a prescribed, uniform thickness, wherein the third layer is formed of a prescribed metal oxide having a refractive index greater than 2.0, wherein the metal incorporated in the coating's first, second and third layers is the same and is selected from the group consisting of niobium, titanium, hafnium and zirconium, and wherein the prescribed thicknesses of the first, second and third layers are selected to provide the partial reflector with prescribed, non-zero reflectance and transmittance values that are substantially uniform over a wavelength band of about 400 to 700 nanometers.

15. A partial reflector as defined in claim 14, wherein the multi-layer, thin-film coating is configured such that the reflector has a transmittance of at least 20% and a reflectance of at least 20%, over a wavelength band of about 400 to 700 nanometers.

16. A partial reflector comprising:

a substrate having a front surface and a rear surface;

an antireflection coating deposited on the rear surface of the substrate; and a multi-layer, thin-film coating deposited on the front surface of the substrate, wherein the multi-layer coating includes a first layer having a prescribed, uniform thickness, wherein the first layer is formed of a prescribed metal oxide having a refractive index greater than 2.0, a second layer overlaying the first layer and having a prescribed, uniform thickness, wherein the second layer is formed of a prescribed metal, and a third layer overlaying the second layer and having a prescribed, uniform thickness, wherein the third layer is formed of a prescribed metal oxide having a refractive index greater than 2.0, wherein the metal incorporated in the coating's first, second and third layers is the same and is selected from the group consisting of niobium, titanium, hafnium and zirconium, and wherein the prescribed thicknesses of the first, second and third layers are selected to provide the partial reflector with prescribed, non-zero reflectance and transmittance values that are substantially uniform over a wavelength band of about 400 to 700 nanometers.

17. A partial reflector as defined in claim 16, wherein the multi-layer, thin-film coating is configured such that the reflector has a transmittance of at least 20% and a reflectance of at least 20%, over a wavelength band of about 400 to 700 nanometers.

* * * * *